United States Patent [19]

Herr et al.

[11] 3,952,424
[45] Apr. 27, 1976

[54] METHOD AND APPARATUS FOR IMPROVING MUSCULAR COORDINATION

[75] Inventors: Paul Herr, Huntingdon Valley; Dubi Leumi, Philadelphia, both of Pa.

[73] Assignee: Motor Skills Research, Inc., Horsham, Pa.

[22] Filed: Dec. 19, 1974

[21] Appl. No.: 534,499

[52] U.S. Cl. .............................. 35/29 R; 35/22 R; 35/36
[51] Int. Cl.² .................................. G09B 11/00
[58] Field of Search ............... 35/22 R, 22 A, 29 R, 35/29 D, 29 E, 32, 33, 36, 37, 62; 273/1 E

[56] References Cited
UNITED STATES PATENTS

| | | | |
|---|---|---|---|
| 692,019 | 1/1902 | Kolshorn | 35/32 |
| 2,708,797 | 5/1955 | Hamer | 35/33 |
| 2,863,666 | 12/1958 | Aronson | 35/22 R X |
| 3,208,747 | 9/1965 | Kavakos | 273/1 E |
| 3,581,408 | 6/1971 | Mohier | 35/22 A |

FOREIGN PATENTS OR APPLICATIONS 70,642   1/1893   Germany .......................... 35/33

OTHER PUBLICATIONS
"Beat the Buzz", Kenner Products Advert. p. 52, Aug. 1959, Playthings Magazine.

*Primary Examiner*—Harland S. Skogquist
*Attorney, Agent, or Firm*—Caesar, Rivise, Bernstein & Cohen, Ltd.

[57] ABSTRACT

A method and apparatus for training the motor movement of a person to make writing more easily learned. The apparatus includes a frame having a pair of horizontal bars. A large, bright colored ball is disposed on one bar and a smaller, bright colored ball is disposed on the other bar. The frame includes means for supporting a looped bar and an undulating bar. Each bar may be disposed in two vertical planes and one horizontal plane. A ball is provided on each of the looped and undulating bars. Each of the balls includes a finger hole and a smaller writing implement-receiving hole therein. The bars, with their associated ball thereon, are disposed in a predetermined sequence of orientations so that the balls thereon can be moved in a predetermined sequence wherein the balls are first moved along horizontal straight bars, then along the undulating bar and finally along the looped bar. The movement of the balls along each of the bars is accomplished in a four step sequence, the first step movement being effected by the user's hand, the second step movement being effected by the user's finger in the finger hole, the third step movement being effected by the use of a relatively large peg inserted in the finger hole and the fourth step movement being effected by a writing implement disposed in the writing implement-receiving hole.

8 Claims, 14 Drawing Figures

METHOD AND APPARATUS FOR IMPROVING MUSCULAR COORDINATION

This invention relates to educational devices and methods therefore and more particularly to a system and method for preparing a child for learning to write.

Handwriting is a complex psychromotor process and, as is generally recognized by educators, the development of sufficient muscular coordination is of paramount importance in learning the process of writing.

Heretofore the teaching of writing has been directed at instructing the pupil, e.g., child or retardee, the shape of the letters while attempting to have the pupil duplicate those letters. Very little attention has been directed at developing sufficient muscular coordination to enable the pupil to write successfully once taught the shape of the letters.

Since each letter of all alphabets incorporate a complex sequence of left, right, up and down movements, it can be appreciated that very poor handwriting ability by a pupil is frequently the result of insufficiently developed muscular coordination.

While various muscular coordination developing system have been disclosed and are available, such systems have not met with wide acceptance due to various inherent drawbacks, the most basic of which being the failure of the system to refine gross movement to a level sufficient for achieving satisfactory writing skills.

Accordingly, the need exists for a system for preparing pupils to write by aiding in the development of muscular coordination.

With that need in mind it is therefore the general object of this invention to provide a method and apparatus for developing muscular coordination and motor skills in a pupil and to channel them toward handwriting skills.

It is a further object of this invention to provide a method and apparatus for training motor movement of a pupil in a manner to make writing more easily learned and therefore highly reinforcing.

It is still a further object of this invention to provide a method and apparatus for refining a pupil's gross motor movements to a level compatible with the ability to write satisfactory.

It is yet a further object of this invention to provide a method and apparatus for enabling a pupil to facilely form the basic lines which serve as a common denominator for the writing of any language.

It is another object of this invention to provide a method and apparatus for preparing a pupil for the acquisition of handwriting skills while enabling the instructor to evaluate the pupil's motor skills.

It is still another object of this invention to provide a method and apparatus for improving a pupil's hand-eye coordination.

It is yet another object of this invention to provide a method and apparatus for teaching a pupil directionality and other abstract concepts such left, right, big, small, over, under, etc.

These and other objects of this invention are achieved by providing a system for developing muscular coordination to facilitate the learning of writing skills. The system comprises first means for establishing a first linear path, a first movable member supported by the first means for movement along the first path, second means for establishing a second linear path, second movable member, smaller in size than the first movable member and supported by the second means for movement along the second path, a third movable member for establishing an undulating path, a third member is supported by the child means for movement along the undulating path, fourth means for establishing a generally looped path and a fourth member supported by the fourth means for movement along the looped path. The system also includes a frame having support means for supporting the first and second means so that the linear paths are horizontal and for supporting either the third or the fourth means so that the paths established thereby are either oriented horizontally or vertically. Each of the movable members includes a finger-receiving hole and a writing implement-receiving hole therein.

Other objects and many of the attendant advantages of this invention will become readily appreciated as the same becomes better understood by reference to the following detailed description when considered in connection with the accompanying drawings wherein.

Figure 1:
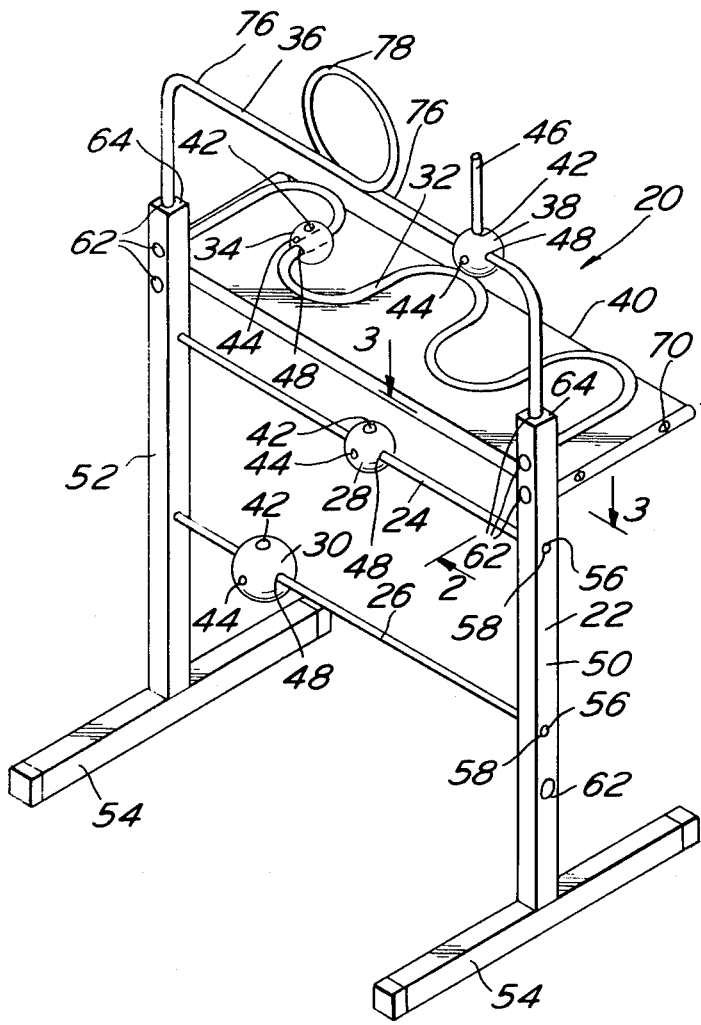
FIG. 1 is a perspective view of apparatus for developing motor skills in a pupil in accordance with this invention.

Referring now to the various figures of the drawing wherein like reference characters refer to like parts, there is shown in FIG. 1 apparatus 20 in accordance with this invention. This apparatus, as will be seen hereinafter, trains the motor movements of the shoulder, arm, wrist, fingers and eyes of the pupil in such ways to make writing more easily learned and, therefore, highly reinforcing.

The apparatus basically comprises a frame 22 supporting a pair of straight bars 24 and 26 having slidable members 28 and 30, respectively, thereon, undulating bar 32 adapted to be supported by the frame and adapted to mount a slidable member 34 thereon, a looped bar 36 adapted to be supported by the frame and adapted to mount a slidable member to be supported by the frame and adapted to mount a slidable member 38 thereon and a planar writing surface 40 adapted to be supported by the frame 22.

Each of the movable members 28, 30, 34 and 38 are generally ball shaped and are hereinafter referred to as balls. The balls 28, 34 and 38 are of generally the same size and are smaller the ball 30 for reasons to be described hereinafter. It should be pointed out at this juncture while three small balls 28, 34 and 38 are shown in FIG. 1, such a figure is merely representative of all of the components of the system for display purposes. In accordance with the preferred embodiment of the system only two small balls are utilized, with the ball 28 being shown on straight bar 24 being either one of the balls 34 or 38 shown of the undulating bar 36 and looped bar 36, respectively. Of course, it is to be understood that in fact three balls, like those shown in FIG. 1, can be used if desired.

Figure 2:
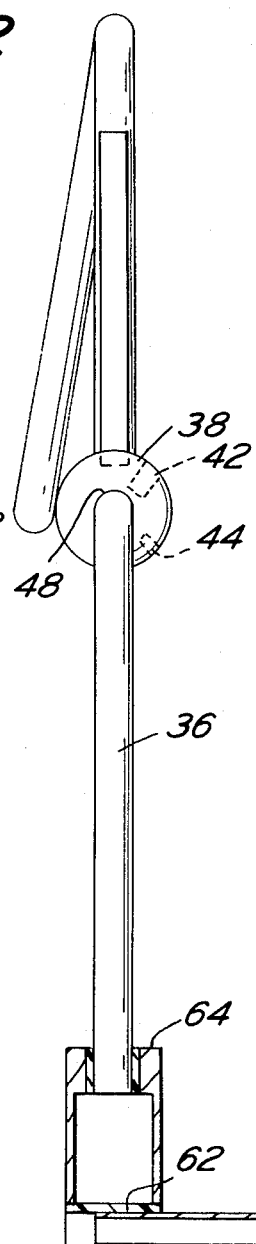
FIG. 2 is an enlarged sectional view taken along line 2—2 of FIG. 1.

The balls 30, 34 and 38 are each of a different bright color. In the preferred embodiment of this invention ball 30 is bright blue, ball 34 is bright yellow and ball 38 is bright red. As can be seen in FIGS. 1 and 2 each of the balls includes a large opening 42 and small opening 44. The large opening 42 of sufficient size to enable the insertion of a pupil's index finger therein and is referred to hereinafter as a finger hole. The small hole is dimensioned so as to enable the reception of a writing implement, such as a pencil therein, and is hereinafter referred to as pencil-hole.

The apparatus 20 also includes a wooden peg 46 which is suitably dimensioned to fit within the finger-hole 44 for purposes to be described later.

Each ball is arranged to be slid along the bar on which it is disposed in order to develop the muscular coordination for moving a writing implement in a path similar to the path as defined by the bar. To that end, each ball includes a central passageway 48 therein through which the associated bar passes when the ball is mounted thereon. The diameter of the passageway is such as to facilitate the free slidability of the ball along the bar but not so large as to enable the ball to wobble substantially.

As can be seen in FIG. 1 the frame 22 includes a pair of vertical standards 50 and 52, each of which is connected to a horizontal base bar 54. The horizontal base bar is arranged to rest on the floor to support the standards 50 and 52 in their vertical orientation. The standards in turn support the straight bars 24 and 26 in a horizontal orientation. To that end, each standard includes a pair of openings 56 therein. The openings of one standard are aligned with the corresponding openings in the other standard. As can be seen clearly in FIG. 3 a bolt 58 is disposed through the opening 56 in the standard and is in threaded engagement with a threaded longitudinal hole 60 in the end of bar 24 in order to support the bar on the frame. A similar bolt is provided to support the other end of the bar 24 on the frame. Bar 26 is supported in a similar manner by another pair of bolts 58 extending through aligned holes 56.

The undulating bar 32, the looped bar 36 and the writing surface 40 are each arranged to be disposed and supported in various orientations on the frame 22. To that end, a plurality of sockets 62 are provided in the standards 50 and 52. For example, the top edge 64 of each of the standards includes a socket 62 therein. A pair of sockets are provided in the standards adjacent the top end 64 and extend through the standards from front to rear (see FIG. 3). Another socket 62 is provided in the outside face of the standards and adjacent the base bars 54.

Figure 3:
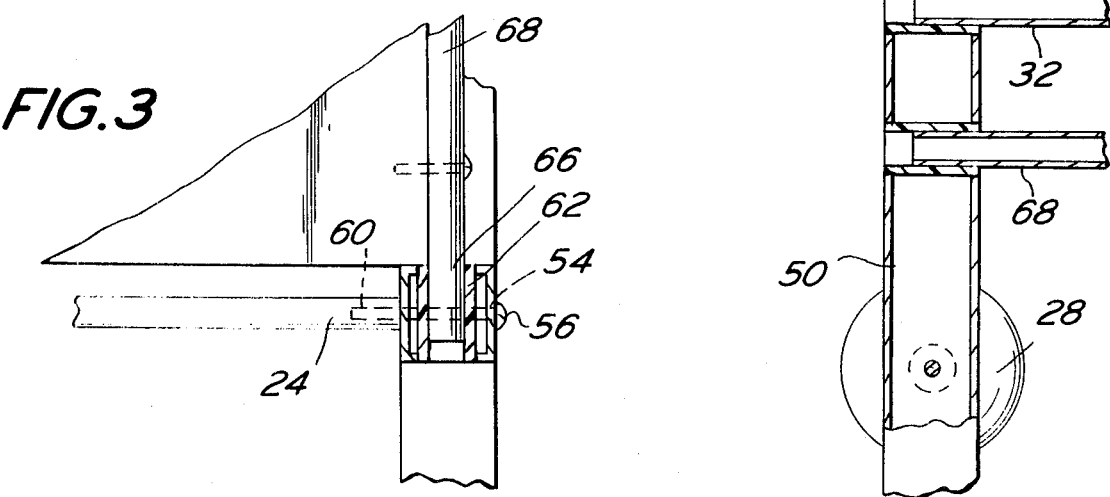
FIG. 3 is an enlarged sectional view taken along line 3—3 of FIG. 1.

As can be seen in FIG. 3, each of the sockets comprises a plastic sleeve extending through the standard and including a central passageway 66 into which the ends of the bars 32 and 36 may be disposed. The writing surface 40 includes a pair of bars 68 secured to the side edges thereof via screws 70. The bars 68 include free ends (now shown) adapted to fit within the central passageway 66 of the sleeve 62 to effect the support of the writing surface on the frame.

Figure 4:
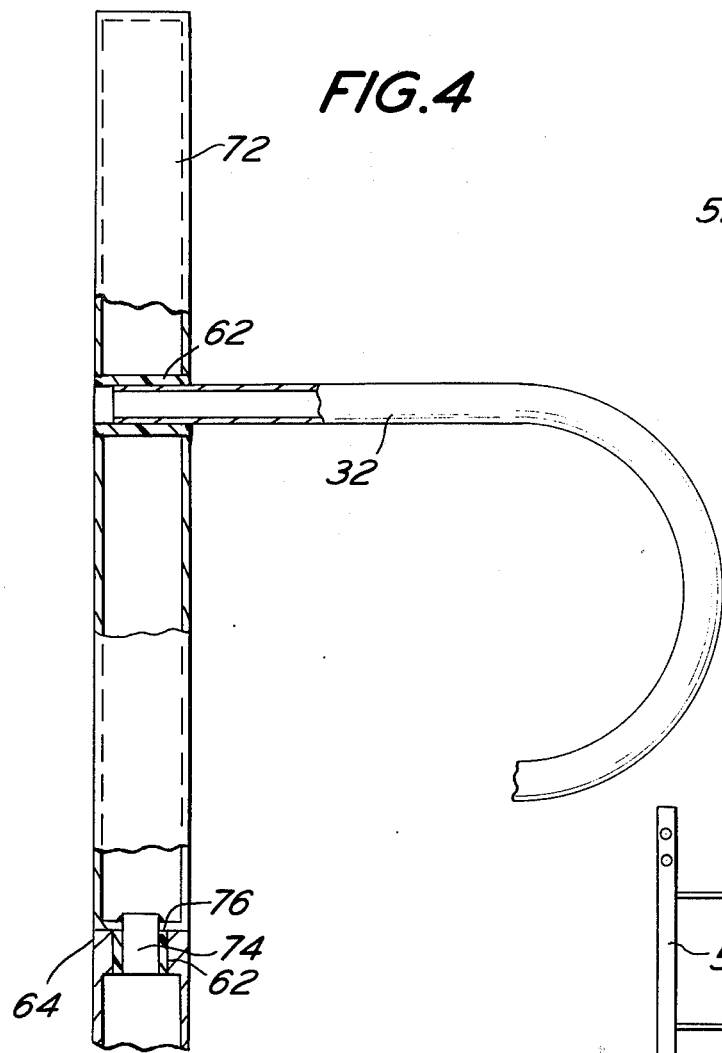
FIG. 4 is an enlarged view, partially in section, of a portion of the apparatus shown in FIG. 6 within area 4.

The apparatus 20 also comprises an extension 72 (see FIG. 4) for extending the height of either of standards 50 and 52 so as to enable the support of the undulating bar 32 and the looped bar 36 in a vertical orientation. To that end, extension 72 includes a tubular projection 74 extending from its bottom edge 76. Extension 74 is adapted to fit within sleeve 62 in top edge 64 of either standard. Extension 72 includes a support sleeve 62 extending through its side surface 62. The sleeve 62 in extension 72 serves as the means for supporting the upper end of either undulating bar 32 or looped bar 36 when said bar is mounted in a vertical orientation (see FIGS. 4, 6 and 7).

As should be appreciated the straight bars 24 and 26 serve to extablish a linear path of movement for the balls thereon, while the bar 32 being of undulating shape establishes an undulating or curved path of movement for the ball 34 disposed thereon and the bar 36, which includes a straight portion 76 which turns into a loop 79 and which terminates in a straight portion 78 establishes a looped path.

As will be appreciated the paths defined by the bars 24, 26, 32 and 36 are common for the writing and printing of various letters of the alphabet and in this regard produce the flowing movement that can be applied to various styles of writing. For example, the straight bars produce the flowing movements useful in printing the letters "Z", "1", "M", "A", "W", "y", "Y", "i", "I" and "L". The undulating bar produces the flowing movement useful in the printing and script of the letters *m, n, j, f, t,* the script of the letter *x,* the printing of the letters "S" and "*r*". The looped bar 78 the flowing movement useful in printing the letters "*o*", "*p*", "*q*", "*Q*", "*g*", "*b*", "*e*", and in the script for the letters "*e*" and "*l*".

As will be appreciated there are few cursive letters which do not conform exactly to the bar shapes. For example, the script "*e*" and "*l*" do not conform to the circular loop and in this regard imaginative elongation of the loop bar is required.

The apparatus 20 is used in a predetermined sequence in accordance with the method of this invention to enable the pupil to pregress from simple movements to more complex movements, while refining his muscular control from gross to fine for such movements. Insofar as the former aspect is concerned, the method entails the progression of movements starting with linear movements, followed by more complex undulating or curved movements and ending with the most complex movements, that is looping movements. To that end, as will be described in detail later, the pupil first utilizes the linear bars with the balls thereon and slides them therealong to establish linear control. Thereafter, the undulating bar with the ball thereon is utilized by sliding the bar along the bar to extablish curve control. Finally, the pupil utilizes the looped bar with the ball thereon by sliding the ball therealong to establish loop control.

In order to develop fine muscular control for each type of movement, the method of this invention entails the utilization of a specific four step regiment or sequence (as will be described later). The sequence is so designed to enable the pupil to develop his muscular control for the movement associated therewith from gross control (wherein the pupil's entire arm and shoulder is moved) to the fine control requisite for duplicating the movement of a writing implement with muscles of the hand and fingers. Once the pupil has developed such fine motor control a progression is made to the next shaped movement and the refinement of gross motor control for that movement is accomplished through the use of the four step sequence.

Once the pupil has progressed to the stages wherein motor control has been refined for all of the shaped movements the pupil then begins applying the movements to writing by the duplication of the movements with a writing implement, e.g., chalk, on the writing surface. In this regard the pupil is taught to utilize a colored chalk corresponding to the color of the ball associated with each movement in order to provide a sensory bridge between the movement and the duplication of the movement on the writing surface with the chalk.

The four step sequence referred to heretofore entails the following sequential steps. The pupil first grasps the ball with his hand and slides the ball back and forth along the bar on which the ball is disposed to thereby similate the path defined by the bar. This activity exercises the major muscles of the arm and shoulder to establish the gross control to accomplish the movement smoothly. The next step in sequence entails the pupil's insertion of his finger into the finger-hole and sliding the ball back and forth along the path with the finger. This step refines the gross motor movement of the arm and shoulder to include more hand and wrist control. The pupil then proceeds to the next step in the sequence wherein he uses the wooden peg to effect the sliding of the ball back and forth along the path. To that end, the peg is inserted within the finger-hole while the pupil holds the peg in his hand. This activity aids in the development of finger control while further refining hand and wrist control to the point compatible with large scale rudimentary written duplication of the path of movement. The pupil then proceeds to the last step in the sequence wherein a pencil or other similarly sized and shaped writing implement is inserted within the writing implement-hole. The pupil holds the pencil in his hand in the manner in which a pencil is held for normal writing and utilizes the pencil to slide the ball along the path that is established by the bar. This activity further refines hand, wrist and finger control to the point compatible with duplicating the path of movement with a pencil on a writing surface.

As will be described, in addition to developing arm, wrist, hand and finger control, the utilization of the four step sequence of this invention enhances hand-eye coordination as the pupil moves the balls along the paths and follows the movement with his eyes.

In addition, by observing how the pupil grasps the ball, grasps the peg and pencil, moves the ball along the bars, controls the speed of movement and follows the balls with his eyes, the teacher can begin to evaluate the pupil's motor skills and in this regard the method and apparatus of this invention also serve as a diagnostic aid.

In addition to serving as a coordination developer and a diagnostic aid, the apparatus of this invention can be utilized to teach directionality, e.g., right, left, up and down, by the movement of the balls along the bars. This is of significant importance for once a pupil has developed laterality and directionality, left-to-right movements can be stressed in order to establish the basis for proper writing direction. To that end, the pupil can be made aware that the left side of each bar is the "beginning" or "starting line" for any activity on the bar and that the right side of the bar is the "end" or "finish line" of any activity. Accordingly, moving from left to right can be appreciated as "going" while moving from right to left is appreciated as "coming back".

Other abstract concepts can be given concrete form by the use of the apparatus 20. For example, the different sized balls can be used to teach the concepts of big and small. The sliding of the balls can be used to teach the concepts of "across", "back, forth", "up, down", "around", "on, off", "spin" and "slide". The sequential steps performed in the method give meaning to the concepts of "before, after", "in, out", "first, second", and "beginning, middle, end".

Figure 5:
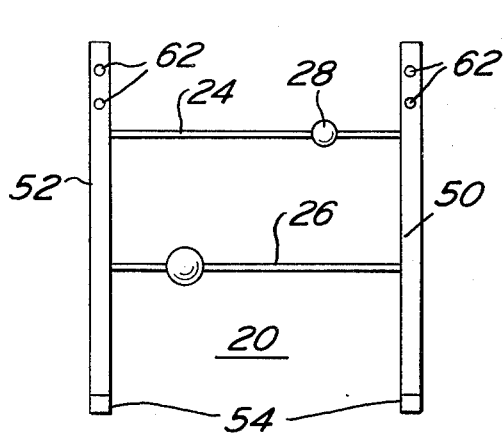
FIG. 5 is a front elevational view of the apparatus of the instant invention shown at the beginning step, referred to as stage one, in the method of the instant invention.

The following is the preferred method for utilizing the apparatus of this invention for preparing a pupil for the acquisition of writing skills by developing his motor control sufficiently to achieve that end. The method entails ten steps, hereinafter referred to as stages, with the initial stages including the heretofore described four step sequence. For example, in the first stage of the method, shown in FIG. 5, only the straight bars 24 and 26 are utilized. To that end, the large blue ball 30 is disposed on the lower bar and the small bar 28 is disposed on the upper bar. The pupil is then directed to follow the four steps of the heretofore described four step sequence with the ball. This sequence is preferably carried out with the pupil first positioned close to one side of the apparatus 20, then with the pupil on the opposite side of the apparatus and finally with the pupil in the center of the apparatus. This process is then repeated with the pupil utilizing the small ball on the upper bar 24.

Figure 6:
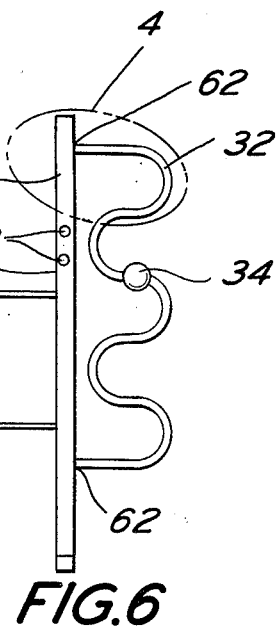
FIG. 6 is a front elevational view of the apparatus of the instant invention during the next step, referred to as stage two, in the method of the instant invention.

Once the pupil has mastered the movement of stage one he progresses to stage two wherein the apparatus is set up as shown in FIG. 6 wherein the undulating bar 32 is disposed vertically by inserting its upper end into the sleeve 62 in extension 72 and its lower end into sleeve 62 in vertical standard 50. In this arrangement the ball is removed from the upper bar and the red ball 34 is disposed on the bar 32. The pupil is then directed to follow the heretofore described steps of the four step sequence.

Figure 7:
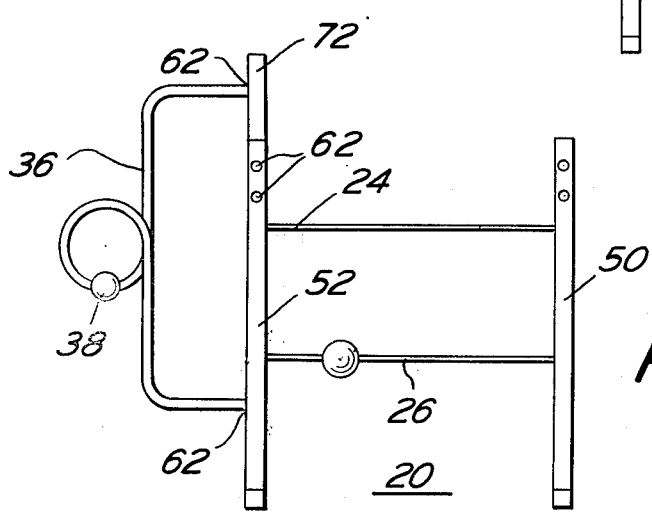
FIG. 7 is a front elevational view of the apparatus of the instant invention during the next step, referred to as stage three, in the method of the instant invention.

When the pupil has mastered the movements of stage two he progresses to stage three wherein the apparatus is set up as shown in FIG. 7. As can be seen therein the extension 72 is disposed within the other standard 52 and the looped bar 36 is utilized in a vertical orientation with its upper end being disposed within sleeve 62 in extension 72 and with its lower end being disposed within sleeve 62 of standard 52. The red ball 38 is mounted on bar 36 for sliding movement with respect thereto. With the apparatus set up as shown in FIG. 7 the pupil is directed to follow the heretofore described four step sequence. As will be appreciated the movement of ball 38 on bar 36 is the most complex movement heretofore attempted and progression to the next stage does not occur until the child can move the ball 38 completely along bar 36 without letting go and without stopping.

Once the child has mastered the movements of stage three he progresses to stage four.

Figure 8:
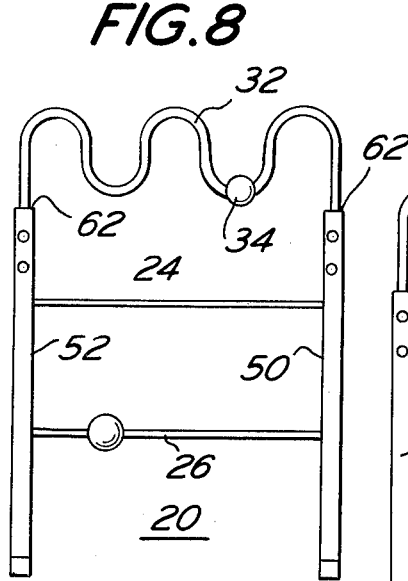
FIG. 8 is a front elevational view of the apparatus of the instant invention during the next step, referred to as stage four, in the method of the instant invention.
Figure 9:
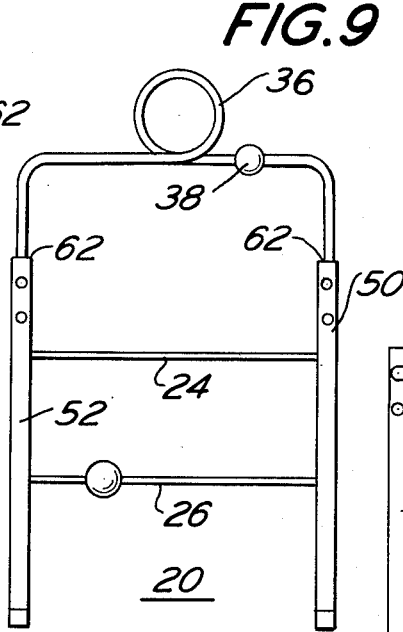
FIG. 9 is a front elevational view of the apparatus of the instant invention during the next step, referred to as stage five, in the method of the instant invention.

In stage four the apparatus 20 is set up as shown in FIG. 8 wherein the extension 72 is removed from standard 52 and the undulating bar 32 with yellow ball 34 thereon is disposed in a horizonal direction with its ends being inserted within respective sleeve 62 in the top wall 64 of the standards 50 and 52. With the apparatus set up as shown in FIG. 8 the pupil is directed to follow the four steps of the four step sequence. Once the child has mastered the movements of stage four he progresses to stage five wherein the undulating bar 32 is removed and replaced by the looped bar 36 with ball 38 thereon. With the apparatus set up as shown in FIG. 9 the child is directed to follow the four steps of the four step sequence. Once the pupil has mastered the movements of stage five he progresses to stage six.

By the time the pupil has completed stage five he has developed sufficient muscular control to duplicate horizontal linear lines (via the use of the straight bars 24 and 26), vertical directionally oriented curved lines (via the use of undulating bar 32 disposed vertically as shown in FIG. 6), vertical directionally oriented straight lines and loops (via the use of the vertically oriented looped bar 36 as shown in FIG. 7), horizontal directionally oriented curves (via the use of the horizontally disposed curved bar 32 as shown in FIG. 8) and horizontal directionally oriented loops (via the use of the horizontally disposed looped bar 36 as shown in FIG. 9).

With the pupil at this stage of development he can now progress to the use of a writing surface to apply the heretofore mastered movements to writing. To that end, in stage six the looped bar 36 is removed and the writing surface 40 is mounted on the frame 20, like that shown in FIG. 1. The curved bar 32 is mounted in a horizontal plane immediately over the writing surface, as also shown in FIG. 1.

Figure 10:
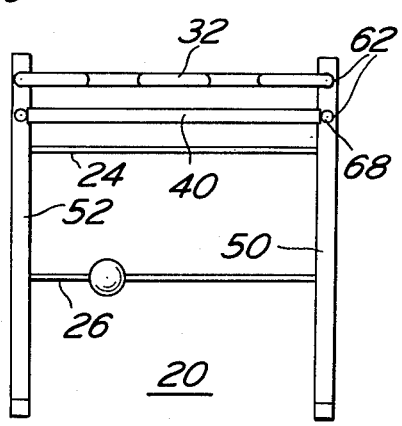
FIG. 10 is a front elevational view of the apparatus of the instant invention during the next step, referred to as stage six, in the method of the instant invention.

The complete set up of the apparatus 20 to accomplish stage six is shown in FIG. 10. With the apparatus set up as shown therein the pupil is directed to trace the shape of bar 32 directly on to the writing surface 40 disposed therebelow with a piece of chalk. Preferably the chalk is yellow so as to provide a sensory bridge between the yellow ball 34 which is associated with the undulating bar and the representation of that bar on the writing surface.

Figure 11:
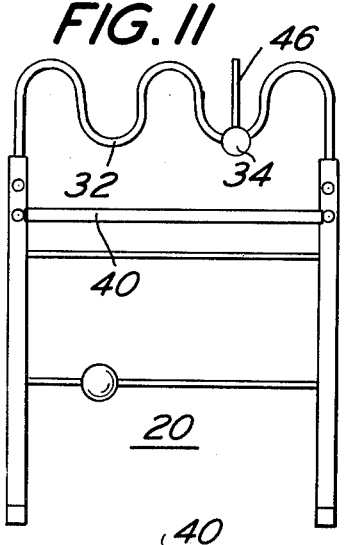
FIG. 11 is a front elevational view of the apparatus of the instant invention during the next step, referred to as stage seven, in the method of the instant invention.

After stage six the pupil progresses to stage seven wherein the apparatus is set up as shown in FIG. 11. In this stage the looped bar 32 is removed from immediately above the writing surface, the yellow ball 34 is inserted on the bar and the bar is then mounted in a horizontal direction but in a vertical plane by inserting the ends of the bar in the sleeves 62 in the top wall 64 of each of the standards. The writing surface 40 is left in the position of stage six.

With the apparatus set up as shown in FIG. 11 the child is encouraged to work and play with the ball on the curved bar while concentrating on the third and fourth step of the basic four step sequence, that is the steps of utilizing the wooden peg to move the ball therealong and utilizing the pencil to move the ball therealong. During stage seven the child is also encouraged to draw the line defined by the bar on the writing surface with the yellow chalk. As will be appreciated during this stage, while the line as defined by the bar appears in a vertical plane, the child is drawing the line on a horizontal plane and is thereby effecting an interplanar translational representation.

Figure 12:
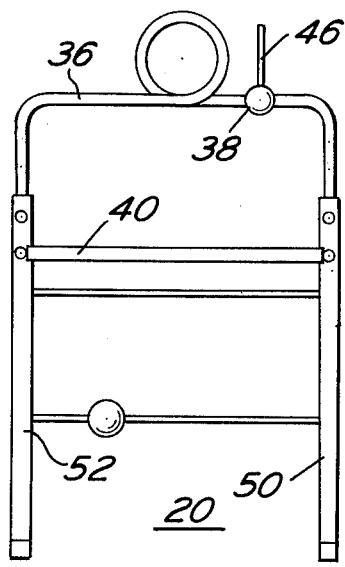
FIG. 12 is a front elevational view of the apparatus of the instant invention during the next step, referred to as stage eight, in the method of the instant invention.

After stage seven the child progresses to stage eight wherein the apparatus is set up as shown in FIG. 12. As can be seen therein as set up in stage eight the apparatus is the same as stage seven except that the looped bar 36 with ball 38 thereon is substituted for the undulating bar 32 with its ball 34 thereon. With the apparatus set up as shown in FIG. 12 stage seven is repeated except that the child draws the line with red chalk to provide a sensory bridge between the path as defined by the bar and the represenatation of that path on the writing surface.

Figure 13:
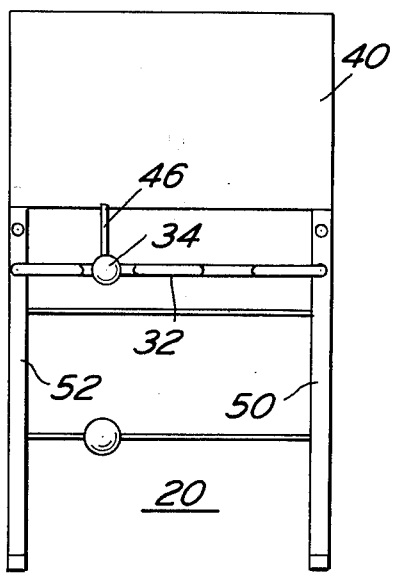
FIG. 13 is a front elevational view of the apparatus of the instant invention during the next step, referred to as stage nine, in the method of the instant invention.

After stage eight the child progresses to stage nine wherein the apparatus is set up as shown in FIG. 13. As can be seen therein in stage nine the writing surface 40 and undulating bar 32 with its ball 48 are utilized, like that in stage seven. However, the planar orientation of the bar and the writing surface is reversed from that of stage seven such that the writing surface is in a vertical plane while the undulating bar is in a horizontal plane. With the apparatus set up as shown in FIG. 13 the child draws the line as defined by the bar.

Figure 14:
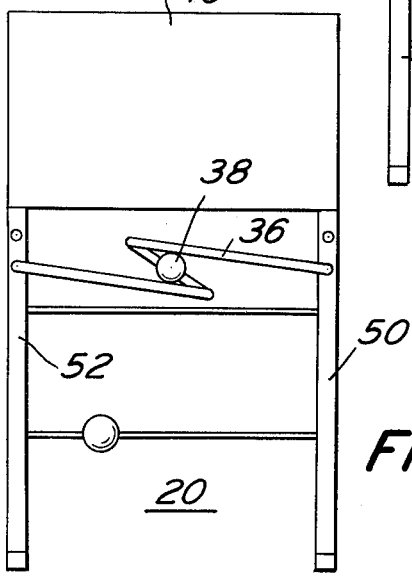
FIG. 14 is a front elevational view of the apparatus of the instant invention during the next step, referred to as stage ten, in the method of the instant invention.

After stage nine the child progresses to the last stage, that is, stage ten. In this stage the apparatus is set up as shown in FIG. 14 and includes the use of the looped bar 36 with its ball 38 thereon and the writing surface 40. The writing surface during this stage remains in the same vertical orientation as in stage nine with the looped bar being supported in the frame so as to lie in a general horizontal plane. With the apparatus as shown in FIG. 14 the child is encouraged to draw the line represented by the curve with red chalk on the writing surface.

After completing the 10 stages of the method free play by the pupil should be encouraged.

It should be kept in mind that it is important that the pupil practice the lines with the proper color chalk and that mirror images be avoided when the bars are copied. When copying the curved bar or the looped bar, the child should always draw the line so that the eye and hand equates "moving away" with "moving up" and "moving towards" with "moving down". It should be noted that this relationship does not apply if either bar is in the vertical orientation like that shown in FIGS. 6 and 7.

As should be appreciated the amount of time to be devoted to each stage will depend on the individual pupil's progress. It has been found that if a pupil is able to work/play with the apparatus three times a week for a period of from 10 to 15 minutes, then each stage will represent approximately 1 week's work.

As will be appreciated from the foregoing the apparatus and method of the instant invention serves to help the pupil (1) develop motor skills in the direction of writing skills, (2) improve hand-eye coordination, (3) learn directionality, (4) develop an awareness of the relationships between vertical and horizontal planes, and (5) understand the concrete form of many abstract concepts. In addition, the use of the apparatus of this invention enables the teacher to evaluate the child's motor skills and teach the shape of any alphabet letter.

Without further elaboration, the foregoing will so fully illustrate our invention, that others may, by applying current or future knowledge, readily adapt the same for use under various conditions of service.

What is claimed as the invention is:

1. Apparatus for developing muscular coordination to facilitate the learning of writing skills comprising first means for establishing a first linear path, a first movable member supported by said first means for movement along said path, second means for establishing a second linear path, a second movable member, supported by said second means for movement along said second path, third means for establishing an undulating path, a third member supported by the third means for movement along said undulating path, fourth means for establishing a looped path, a fourth member supported by said fourth means for movement along said looped path and a frame including support means for supporting said first and second means, with the linear paths established thereby, horizontally and including additional support means for supporting either said third means or said fourth means so that the path established thereby is either oriented horizontally or vertically.

2. The apparatus of claim 1 wherein said second member is smaller than said first member.

3. The apparatus of claim 2 wherein each of said movable members includes a finger-receiving hole and a writing implement-receiving hole therein.

4. The apparatus of claim 3 wherein said first movable means is of sufficient size to be grasped by a child.

5. The apparatus of claim 4 wherein all of said movable members are balls.

6. The apparatus of claim 5 wherein said first ball is a first bright color, said third ball is a second bright color and said fourth ball is a third bright color and wherein said first, second and third colors are different.

7. The apparatus of claim 2 additionally comprising a writing surface and wherein said frame includes additional support means for supporting said writing surface immediately under the third means when said third means is supported on the frame and immediately under the fourth means when said fourth means is supported on the frame.

8. The apparatus of claim 7 wherein each of said movable members includes a finger-receiving hole and a writing implement-receiving hole therein.

* * * * *

UNITED STATES PATENT OFFICE
CERTIFICATE OF CORRECTION

Patent No. 3,952,424　　　　　　　　Dated April 27, 1976

Inventor(s) Paul Herr and Dubi Leumi

It is certified that error appears in the above-identified patent and that said Letters Patent are hereby corrected as shown below:

Column 3, line 13, "generally" should read -- approximately --.

Column 3, line 32, after "opening 42" -- is -- should be inserted.

Column 3, line 43 after "coordination" -- requisite -- should be inserted.

Column 4, line 48 after "W" -- w -- should be inserted.

Column 8, line 44 "10" should read -- Ten --.

Signed and Sealed this

Twentieth Day of July 1976

[SEAL]

*Attest:*

RUTH C. MASON
*Attesting Officer*

C. MARSHALL DANN
*Commissioner of Patents and Trademarks*